(12) United States Patent
Gretenkord

(10) Patent No.: US 11,789,687 B2
(45) Date of Patent: Oct. 17, 2023

(54) DEPICTING DISPLAY REGIONS ON A DESKTOP

(71) Applicant: dSPACE GmbH, Paderborn (DE)

(72) Inventor: Joerg Gretenkord, Paderborn (DE)

(73) Assignee: dSPACE GmbH, Paderborn (DE)

( * ) Notice: Subject to any disclaimer, the term of this patent is extended or adjusted under 35 U.S.C. 154(b) by 168 days.

(21) Appl. No.: 17/554,805

(22) Filed: Dec. 17, 2021

(65) Prior Publication Data

US 2022/0107772 A1    Apr. 7, 2022

Related U.S. Application Data

(63) Continuation of application No. PCT/EP2020/068617, filed on Jul. 2, 2020.

(30) Foreign Application Priority Data

Jul. 8, 2019  (EP) .................................... 19184906

(51) Int. Cl.
  *G06F 3/048*    (2013.01)
  *G06F 3/147*    (2006.01)
  (Continued)

(52) U.S. Cl.
  CPC ............ *G06F 3/147* (2013.01); *G06F 3/0485* (2013.01); *G06F 3/04842* (2013.01)

(58) Field of Classification Search
  CPC .... G06F 3/147; G06F 3/04842; G06F 3/0485; G06F 3/0481; G06F 9/451; G06F 3/048; G06F 3/01; G06F 3/14
  See application file for complete search history.

(56) References Cited

U.S. PATENT DOCUMENTS 5,140,677 A  *  8/1992  Fleming ................ G06F 3/0481
                                                         715/810
5,333,255 A      7/1994  Damouth
                      (Continued)

FOREIGN PATENT DOCUMENTS

DE      692 20 583 T2    2/1998
EP         0494106    *   1/1992   ............. G06F 3/033
                      (Continued)

OTHER PUBLICATIONS

Extended European Search Report for European Application No. 19184906.6 dated Dec. 20, 2019 with English translation.
(Continued)

*Primary Examiner* — Pegeman Karimi
(74) *Attorney, Agent, or Firm* — Muncy, Geissler, Olds & Lowe, P.C.

(57) ABSTRACT

A method for depicting display regions on a desktop. Data for creating and displaying a display region having windows is received. A display region having windows is created. An assignment of the display identifier to the display region having windows is saved. A display identifier of the display region having windows at a predetermined location in a hierarchical list is saved. The display region having windows on the desktop/monitor/screen is displayed. Data for creating and displaying a windowless display region is received and the windowless display region is created on the basis of the data received. The windowless display region is displayed in front of the display region having windows, when the location of the display identifier of the windowless display region in the hierarchical list is before the location of the display identifier of the display region having windows, and vice versa.

9 Claims, 3 Drawing Sheets

(51) Int. Cl.
   *G06F 3/04842* (2022.01)
   *G06F 3/0485* (2022.01)

(56) References Cited

U.S. PATENT DOCUMENTS

| | | | |
|---|---|---|---|
| 5,754,809 A * | 5/1998 | Gandre | G06F 3/04815 |
| | | | 715/848 |
| 6,175,364 B1 | 1/2001 | Wong et al. | |
| 6,683,629 B1 | 1/2004 | Friskel et al. | |
| 7,555,706 B2 | 6/2009 | Chapman et al. | |
| D771,656 S * | 11/2016 | Cranfill | D14/486 |
| 10,848,832 B2 * | 11/2020 | Chai | H04N 21/4312 |
| 11,604,559 B2 * | 3/2023 | Chaudhri | G06F 3/0482 |
| 2009/0070787 A1 | 3/2009 | Diwakar et al. | |

FOREIGN PATENT DOCUMENTS

| | | |
|---|---|---|
| EP | 0 494 106 B1 | 7/1997 |
| EP | 2 034 407 A1 | 3/2009 |
| WO | WO 01/95041 A1 | 12/2001 |
| WO | WO 2015/048601 A1 | 4/2015 |

OTHER PUBLICATIONS

LabVIEW Crash DAbort in imge.cpp or drawmgr.cpp, pp. 1-3 (Feb. 27, 2019).

* cited by examiner

DEPICTING DISPLAY REGIONS ON A DESKTOP

This nonprovisional application is a continuation of International Application PCT/EP2020/068617, filed on Jul. 2, 2020, which claims priority to European Patent Application No. 19184906.6, which was filed in Europe on Jul. 8, 2019, and which are all herein incorporated by reference.

BACKGROUND OF THE INVENTION

Field of the Invention

The present invention relates to a method for displaying display regions on a desktop/monitor/screen/display device.

Description of the Background Art

In the field of IT, the "desktop" is the lowest, rearmost, or last level of the entire display region of graphical user interfaces. It contains closed documents in the form of files and open documents, typically in windows. Common synonyms of the term "desktop" can also be "display", "desk" or "workspace".

Operating systems, such as Microsoft Windows, must have means to access operating system functions and applications running under those operating systems. These means make the operating system and its applications accessible and usable, e.g., by accessing a display region displayed on a desktop, e.g., in a window. In order to be able to access such a window or to retrieve information about the window, the window must be provided with a unique identifier. This unique identifier is generally called "Windows handle". The maximum number of Windows handles is limited, depending on the respective operating system.

For applications that require a large number of different display regions and thus a large number of windows, exceeding the maximum number of allowed Windows handles may cause the operating system to crash or at least to stop generating new windows and thus new display regions, so that the requirements of the application may no longer be met.

Such a problem arises, for example, when displaying measurement data elements for real-time measurement data in hardware-in-the-loop applications. Here, it is sometimes necessary to display or at least maintain a large number of different display regions. In practice, it has been shown that in Microsoft Windows, the limited number of Windows handles restricts the application possibilities of visualization and experimentation software, such as the applicant's product "ControlDesk", to such an extent that the actual possibilities of the software cannot be fully exploited.

"ControlDesk" is software that is used, among other things, to visualize bus systems such as CAN, LIN, Flexray and Ethernet on a computer system. In particular when used with Ethernet, a very high volume of data is possible, which may require a large number of different display regions. With ControlDesk, multiple simulation, ECU, and bus sizes can be quickly and compactly displayed in a multiline element via a single drag-and-drop action. In plotter elements, running measurements can be observed and compared with previous recordings. A time cursor allows jumping to any point in time in the data material. Several plotters can be temporally synchronized with each other during scrolling. The plotter can be switched to a triggered display to make it easier, for example, to analyze high-frequency signals, as with an oscilloscope, for example, to evaluate the step response of a system. All in all, ControlDesk is an extremely powerful tool with a large number of functions and options, which, due to the very large amount of possible data involved, further exacerbates the problem mentioned above with the limited number of handles.

As described, for example, in EP 2 034 407 A1, which corresponds to US 2009/0070787, a possible solution in such cases is to configure some of these display regions windowless. A windowless display region is a display region that is not assigned its own Windows handle and to which a so-called container or parent window provides a common Windows handle. In other words, the container with a Windows handle provides the basis for a variety of windowless display regions, without consuming a further Windows handle with each new display region.

Furthermore, DE 692 205 83 T2, which corresponds to U.S. Pat. No. 5,333,255, describes a sequencer device for determining a sequence of two-dimensional display regions. A forward and a backward direction are defined, so that a hierarchy is created between display regions having windows. According to the forward or backward direction, it is possible to "scroll" between the display regions.

WO 01/95041 A1 overall describes a user interface for the provision of real-time process data with an open display page structure and the separation of the provision of data and server-specific user interactions.

There is a crucial difference between display regions without windows (windowless display regions) and display regions with windows (display regions having windows), in that display regions having windows are hidden from each other by the operating system (as in Microsoft Windows) to create a hierarchy. The content of a display region having windows is automatically overwritten as soon as a further display region having windows is higher up in the hierarchy. Specifically, a display region having windows that is higher up in the hierarchy overlaps or overwrites the display regions. This applies in any case to all child windows of the operating system's desktop, i.e., the content of the desktop having windows. Everything that is displayed directly on the desktop, such as a background image, program icons, etc., is automatically overridden by display regions having windows.

Windowless display regions behave differently. They are displayed directly on the parent window, also called "container". Here, the order of the display alone defines the hierarchy. The last displayed display region appears in the foreground for the viewer. These display regions are not known to the operating system due to the lack of directly assigned Windows handles.

So here, display regions are present on the layout that are not represented by a window and therefore not represented by a Windows handle. Mixed operation of display regions having windows and windowless display regions would therefore result in the display regions having windows always overwriting the underlying area of the layout. It would therefore not be possible to display a windowless display region in front of a display region having windows.

SUMMARY OF THE INVENTION

It is therefore an object of the present invention to provide an efficient way for mixed operation with display regions having windows and windowless display regions.

According to an exemplary embodiment of the invention, a method for depicting display regions on a desktop is thus provided comprising the following method steps: receiving data for creating and displaying a display region having windows, creating the display region having windows on the basis of the data received therefor, assigning a unique Windows handle from a predetermined group of Windows handles and a unique display identifier which is different from the Windows handles, saving the assignment of the display identifier of the display region having windows to the display region having windows, saving the display identifier of the display region having windows at a predetermined location in a hierarchical list, displaying the display region having windows on the desktop, receiving data for creating and displaying a windowless display region, creating the windowless display region on the basis of the data received therefor, assigning a unique display identifier which is different from the Windows handles, saving the assignment of the display identifier of the windowless display region to the windowless display region, saving the display identifier of the windowless display region at a predetermined location in the hierarchical list, and displaying the windowless display region on the desktop, wherein the windowless display region is displayed in front of the display region having windows, when the location of the display identifier of the windowless display region in the hierarchical list is before the location of the display identifier of the display region having windows, and vice versa.

If it is stated here that a display region is displayed in front of or behind a further display region on the desktop, this means that a display region lying in front of a further display region covers the display region below it in the overlapping area of the two display regions so that only the front display region can be seen. This is practically the location of a display region on the desktop in the z-direction, which is perpendicular to the plane of the desktop, if the plane of the desktop is itself divided by the x-direction and the y-direction. The x and y coordinates of a display region are denoted in the following by "location on the desktop", while the location of a display region with respect to its relative z-coordinate, according to the hierarchy given by the list, is referred to in the following as "order on the desktop". This order on the desktop thus determines whether a display region is in front of or behind a further display region and what is displayed by the respective display region—due to overlaps by other display regions.

The invention thus makes it possible to display windowless display regions on the desktop even if the desktop also has display regions having windows. This is made possible by using display identifiers in addition to the Windows handles, which are stored in a hierarchical list. In this case, a windowless display region is displayed in front of a display region having windows if the location of the display identifier of the windowless display region is hierarchically before the location of the display identifier of the display region having windows in the hierarchical list, and vice versa. Theoretically, an infinite number of different display regions is possible, since these can be designed as fullfledged display regions in terms of how displayable they are, without having to be provided with a Windows handle of which only a limited number is available.

Also, the method can comprise the following, further method steps: receiving data for creating and displaying a further display region, creating the further display region on the basis of the data received therefor, assigning a unique display identifier which is different from the Windows handles, saving the assignment of the display identifier of the further display region to the further display region, saving the display identifier of the further display region at a predetermined location in the hierarchical list, displaying the further display region on the desktop relative to the display region having windows and to the windowless display region, corresponding to the hierarchical location of the display identifier of the further display region, relative to the hierarchical location of the display identifier of the display region having windows and to the hierarchical location of the display identifier of the windowless display region in the hierarchical list.

In general, this means that, according to this preferred further embodiment of the invention, there may be a plurality of further display regions for which the order on the desktop is determined by means of the method according to the invention, i.e., without resorting to Windows handles, which are only available in a limited amount. The further display region can have windows or be windowless; if it has windows, of course, a Windows handle is also assigned, but the order on the desktop is still determined by the respective display identifier in the hierarchical list. These method steps can be repeated for further display regions; in the case of windowless display regions, in principle as often as required.

Also, the method can comprise the following, further method steps: receiving data for creating and displaying a first further windowless display region within a display region already displayed on the desktop, creating the first further windowless display region on the basis of the data received therefor, assigning a unique display identifier which is different from the Windows handles, saving the assignment of the display identifier of the first further windowless display region to the first further windowless display region, saving the display identifier of the first further windowless display region at a predetermined location in a hierarchical sub-list associated with the already displayed display region, displaying the first further windowless display region within the display region already shown on the desktop, receiving data for creating and displaying a second further windowless display region within the display region already displayed on the desktop, creating the second further windowless display region on the basis of the data received therefor, assigning a unique display identifier which is different from the Windows handles, saving the assignment of the display identifier of the second further windowless display region to the second further windowless display region, saving the display identifier of the second further windowless display region at a predetermined location in the hierarchical sub-list associated with the already displayed display region, and displaying said second further windowless display region within said display region already displayed on said desktop, wherein said first further windowless display region is displayed in front of said second further windowless display region, when in the sub-list assigned to the already displayed display region, the location of the display identifier of the first further windowless display region is hierarchically located before the location of the second further windowless display identifier of the display region having windows, and vice versa.

In this way, what is called the "container function" of a display is realized. This display region acting as a container can basically be windowless or have windows. Of course, further windowless display regions, such as a third windowless display region, a fourth windowless display region, etc., can also be displayed in the container. Towards the outside, i.e., opposite display regions lying outside the container, with regard to the display hierarchy, the display regions in the container are treated like the container itself.

In principle, the display region already displayed on the desktop, in which further windowless display regions are displayed, could have windows. However, according to a preferred further development of the invention, the display region already displayed on the desktop, in which further windowless display regions are displayed, is windowless. Here, too, the advantage applies that there can basically be any number of windowless display regions, that there is no numerical limitation due to Windows handles.

For saving the display identifier of a newly created display region in the hierarchical list, the invention provides various possibilities. According to a preferred further development of the invention, however, the saving of the display identifier of a newly created display region is done at the top of the hierarchical list. In this way, a newly created display region is always immediately visible because it is displayed in front of all other display regions due to the location of its display identifier in the hierarchical list. Additionally, or alternatively, according to a preferred further development of the invention, the saving of the display identifier of a display region selected with a pointing device on the desktop at the hierarchical top location in the hierarchical list is provided. In order to display a display region, this display region can thus simply be selected with a pointing device, such as a computer mouse, e.g., by clicking on it.

The method can also further comprises the following method steps: arranging a display region at a predetermined location on the layout, determining all the regions of the other display regions displayed on the desktop that overlap with the display region located at the predetermined location, and clipping out these overlapping regions of the other display regions so that the display region arranged on the layout at the predetermined place is completely visible.

In this way, a windowless display region can be displayed that has been brought to the very front of the display region sequence. Accordingly, incidentally, the same can be done for a display region having windows that needs to check its window for overlaps and update, if necessary, a clipping of its area when the display region having windows changes its location on the desktop. In addition, this feature can also be used with the containers described above: When setting the location of a display region within the container (child display region in the container acting as parent), the outer limits of the container are checked. If a child display region extends outside the container, it is trimmed accordingly.

In principle, the displays on the desktop, i.e., the different display regions on the desktop, can be based on different types of data. Thus, the method can also comprise the following method steps: continuously receiving data for updating the displays of a display region displayed on the desktop, updating the displays of the display region displayed on the desktop on the basis of the continuously received data, and minimizing or hiding the display region in response to a user command, wherein for the minimized or hidden display region the continuous reception of data is interrupted.

Continuous receiving of data means that new data is received repeatedly, e.g., current measurement data. This receiving can take place, e.g., continuously, in a predefined cycle or event-oriented. A display region is preferably reduced to an icon saved to the desktop, i.e., without any further visible content, or to a pure taskbar, e.g., by collapsing, possibly with a designation of the display region in the taskbar. If a container is minimized or hidden, all display regions contained in the container are no longer displayed and the continuous reception of data for these display regions is also interrupted. This interruption of data reception is ended when the display region, e.g., the container, is opened again, e.g., by expanding.

The method can be used for quite different applications. For example, the display regions can be used to display measurement data elements for real-time measurement data in hardware-in-the-loop applications. Also, the windowless display regions within a container can be used for this purpose.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
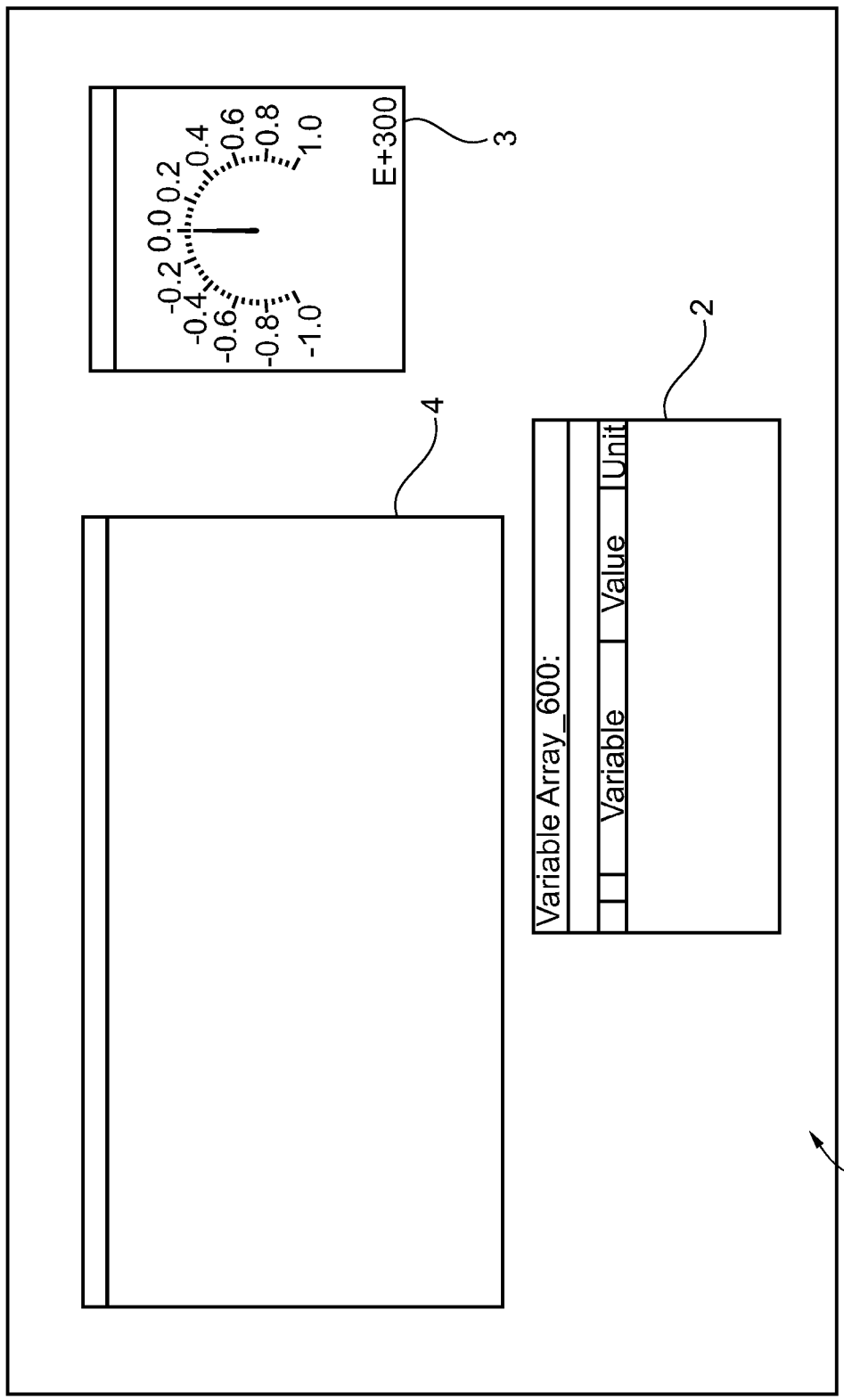
FIG. 1 is a schematic view of a desktop with two elements formed by conventional display regions having windows and an empty windowless container element according to an example.

Prior to the following description of a preferred embodiment of the invention, for the sake of completeness, the problem on which the invention is based should again be briefly mentioned. For the purpose of this example, it is assumed that the application is running under the Microsoft Windows operating system. Of course, the use of other operating systems, such as macOS or Linux, is also possible within the scope of the present invention.

Windowless display regions and display regions having windows have a significant difference: Display regions having windows are hidden from each other by the operating system (as in Microsoft Windows) to create a hierarchy. Everything that is displayed directly on the desktop, such as a background image, program icons, etc., is automatically overwritten by display regions having windows. Windowless display regions, on the other hand, behave differently. The hierarchy is displayed directly on a parent window (container). Here, the order of display alone defines the hierarchy. The display region displayed last appears in the foreground for the viewer. These display regions are not known to the operating system due to the lack of directly assigned Windows handles. This means however, that display regions exist on the layout which are not represented by a Windows handle. Thus, without further measures, mixed operation of display regions having windows and windowless display regions could cause display region having windows to always overwrite the underlying area of the layout, which would make it impossible to display a windowless display region in front of a region having windows.

This is where the container element described below sets in according to the present preferred embodiment of the invention. The field of application described here is the use of display regions on a desktop for displaying measurement data elements for real-time measurement data in hardware-in-the-loop applications. Here, the container element is designed as a windowless display region. Individual elements can be added to this container element, namely as child display regions, which are held in the container, which thus acts as a parent display region. These elements are then managed in the container element and displayed within the display region defined by the container element. This makes them independent of the layout, e.g., they can be moved and/or scrolled without having a direct influence on the layout.

As stated, the container element is windowless, i.e., it requires no Windows handle. Since the number of Windows handles is limited throughout the operating system and cannot be extended, it saves resources and can be used simultaneously in unlimited numbers.

Incidentally, other container elements can also be used in the container element. This means that a plurality of elements can be completely replaced by one container element. In addition, this way previously non-existent elements can be created in a simple manner.

The contents of the container element can be hidden. This means that the container element can be collapsed, for example. Then only a minimal representation of the element remains on the desktop. This representation of the element on the desktop can be freely configurable.

In particular, it conserves resources if the collapsing of the container element results in all elements contained in the container element being encapsulated from the display of data during a measurement. This means that these elements do not burden the performance of the overall system and the user of the system can decide more specifically what he wants to see. The user can set how the element should behave, i.e., whether it should automatically zoom in or out or not, whether it should scroll or not, whether contained elements can be changed or not, etc.

Up to now, problems with resources/performance have been solved in the state of the art by using a layout that contains only a small part of the elements and distributing it over several layouts that can then be opened or closed as required. Space problems on the layout have so far usually been solved by scrolling or moving displays to other layouts. This is no longer necessary when the container element is used in accordance with the presently described preferred embodiment of the invention, in which, when the display region is collapsed/minimized, no more data is received for the elements that are not displayed.

Specifically, the container element described above may be configured as follows:

FIG. 1 shows a desktop 1 with two elements 2, 3 formed by conventional display regions having windows. Furthermore, an empty container element 4 is present on the desktop 1. As can be seen from FIG. 1, the present container element 4 essentially looks like an empty element, i.e., an element without any display of measurement data or the like.

Figure 2:
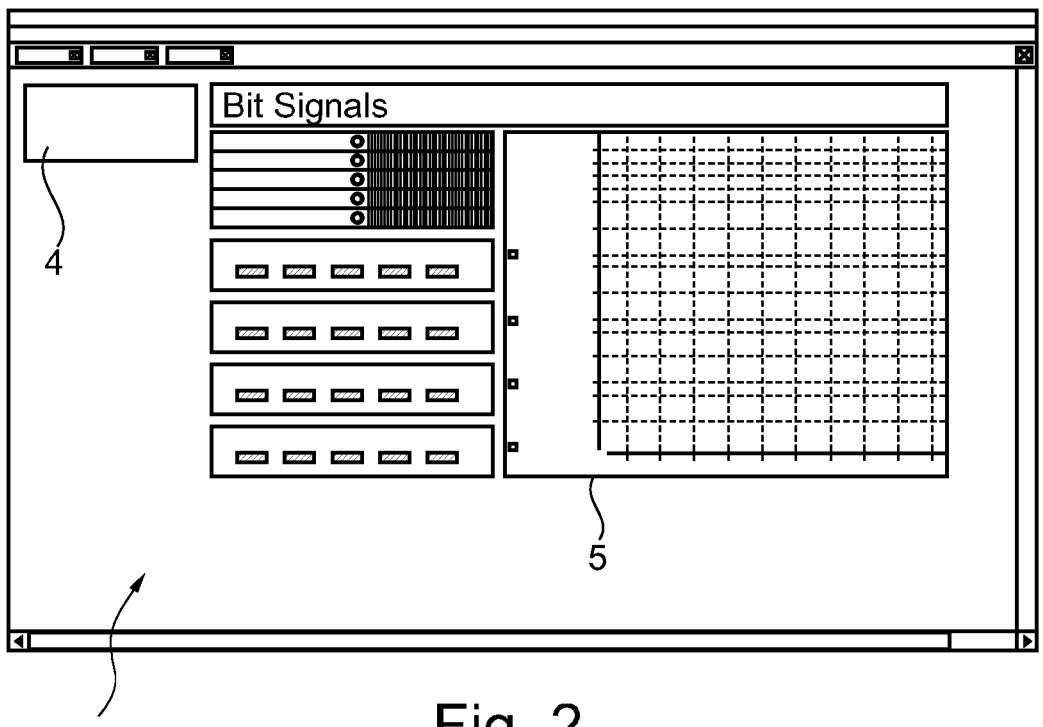
FIG. 2 is a schematic view of a desktop with a large element formed by a conventional display region having windows and an empty windowless container element according to an example.
Figure 3:
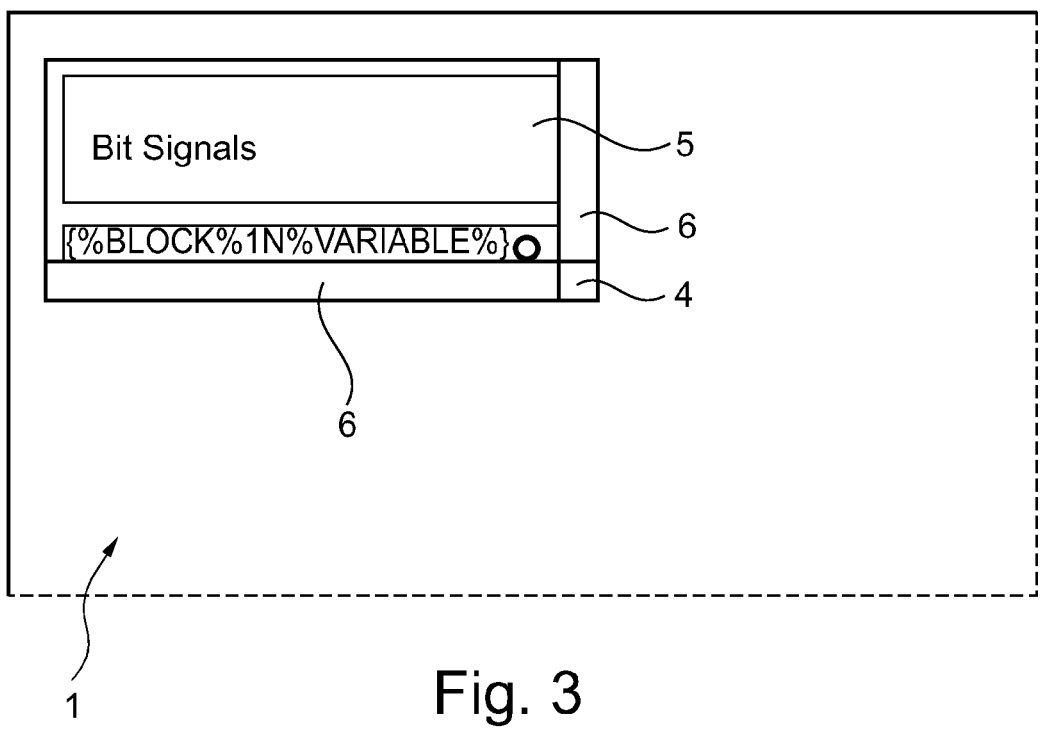
FIG. 3 is a section of the desktop from FIG. 2, wherein the large element is added to the windowless container element.

Another example of a desktop 1 with a container element 4 is shown in FIG. 2. In FIG. 2, the desktop 1 also has a very large element 5 that takes up most of the desktop 1. If this large element 5 is added to the container element 4, as shown in FIG. 3, the displays of the large element 5 are still available in principle, but, if desired, in a smaller space. Specifically, the complete contents of the large element 5 from FIG. 2 have been added to the container element 4. As you can see, there is a significant space saving, because the container element 4 can be reduced in size and then scroll bars 6 are displayed to reach the hidden element areas.

Figure 4:
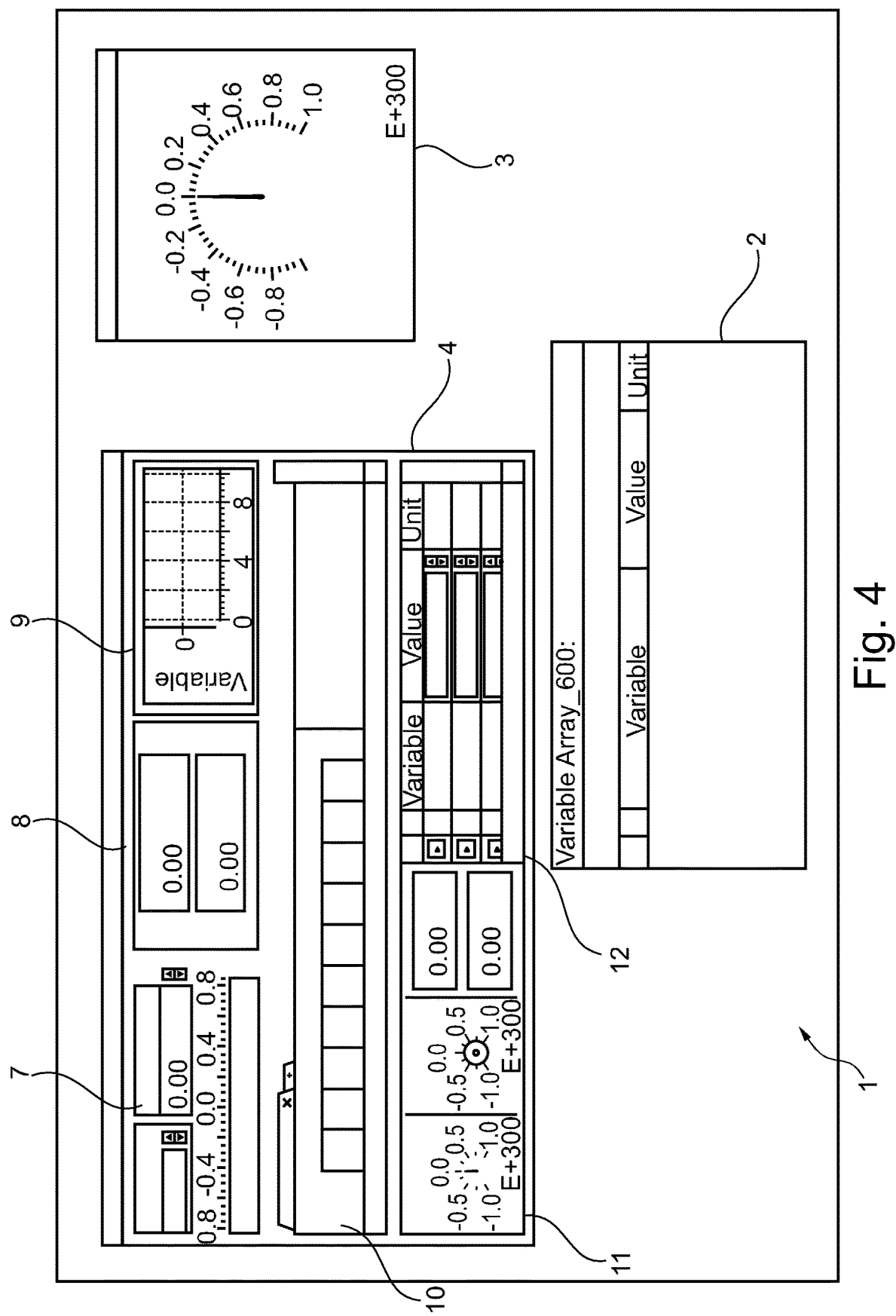
FIG. 4 is the desktop from FIG. 1, wherein a plurality of elements have been added to the windowless container element, some of which are also designed as container elements.

The advantage of the container element 4 becomes even clearer when container elements 7, 8, 9, 10, 11, 12 are used in the container element 4, as shown in FIG. 4. Here, various elements 7, 8, 9, 10, 11, 12 have been added to the container element 4 from FIG. 1. It can be seen that individual areas can be scrolled; thus, a previously defined space requirement is sufficient, and a predefined structure can be maintained within the layout. Furthermore, it can be seen here that the elements 7, 10, 12 in the container element 4 can be scrolled locally, whereby other elements 7, 8, 9, 11 in the container element 4 and other elements 2, 3 outside the container element 4 are not affected.

In principle, container elements can be nested with other container elements at arbitrarily deep levels. Thus, each container element can contain any number of container elements, which in turn can contain any number of container elements. The container elements can be used simultaneously without limits, can represent any number of layers, do not consume any Windows handles, and also consume only little memory. In addition, hidden elements can be "shut down" to such an extent that they consume almost no resources. Accordingly, the system/application has more power available.

Here, it is possible to install windowless elements corresponding to windowless display regions, above or in front of elements having windows corresponding to display regions having windows. The associated problem mentioned above is solved as follows:

Every element, regardless of whether it is windowless or has windows, receives a unique display identifier which is different from the Windows handles. A hierarchical list with these display identifiers is stored as well as the assignment of a respective display identifier to a respective element. The location of the respective display identifier in this hierarchical list determines the order of the elements on the layout, i.e., whether an element is displayed in front of or behind a further element. Here, the first element in the list is at the top of the layout. The element in the foreground has the place at the very beginning of the list. If an element moves to the front, it will be placed correspondingly further to the front in the list. This results in a clear sequence.

When setting the location of an element on the layout, i.e., its x and y coordinates, all elements below it that overlap with the element are searched. This is possible because of the hierarchical list. This provides the unique display identifier and in turn the corresponding element, so that its location can be queried.

Once all overlapping elements have been found and saved in a list, an additional list of the overlapping elements is created. For each element in the list, the common area is clipped from the respective element. With the Microsoft Windows operating system, for example, this is possible with the Windows API function "SetWindowRgn( . . . )". This allows for a windowless element to appear in front of an element having windows, since the clipped area of the element is no longer drawn by the operating system. Or, in other words: The area behind it becomes visible, and so does the element which is still drawn directly on the layout but appears to the user in front of the element having windows. Similarly, an element having windows checks its display region for overlaps when it changes its location on the layout and modifies its clipping if necessary.

Exactly this technology is used by the container element to display elements having windows as well as windowless elements. The container element is windowless and behaves like any other windowless element, so that it can sit in front of elements having windows. Therefore, it only has to take care of its own content, the child elements. So, the element is effectively a windowless parent element for elements that can be displayed in it.

In addition, when setting the location of a child element, the container element checks the clipping of the child element for its outer borders. If a window protrudes from the container element (check via "ClientRectangle"), it will be clipped with the function "SetWindowRgn( . . . )". When collapsing, all child elements are no longer drawn and so are not visible. The WindowsAPI function "ShowWindow" is used to hide the windows of elements having windows.

When expanding, all child elements will be drawn normally again, and the display regions of elements having windows will be made visible again using the WindowsAPI function "ShowWindow".

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for depicting a display region on a desktop, the method comprising:
   receiving data for creating and displaying a display region having windows;
   creating the display region having windows on the basis of the data received therefor, assigning a unique windows handle from a predetermined group of windows handles and a unique display identifier which is different from the Windows handles,
   saving the assignment of the display identifier of the display region having windows to the display region having windows;
   saving the display identifier of the display region having windows at a predetermined location in a hierarchical list;
   displaying the display region having windows on the desktop;
   receiving data for creating and displaying a windowless display region;
   creating the windowless display region on the basis of the data received therefor;
   assigning a unique display identifier which is different from the windows handles;
   saving the assignment of the display identifier for the windowless display region to the windowless display region;
   saving the display identifier of the windowless display region at a predetermined location in the hierarchical list; and
   displaying the windowless display region on the desktop, wherein the windowless display region is displayed in front of the display region having windows, when the location of the display identifier of the windowless display region in the hierarchical list is before the location of the display identifier of the display region having windows and vice versa.

2. The method according to claim 1, further comprising:
   receiving data for creating and displaying a further display region;
   creating the further display region on the basis of the data received therefor, assigning a unique display identifier which is different from the windows handles;
   saving the assignment of the display identifier of the further display region to the further display region;
   saving the display identifier of the further display region at a predetermined location in the hierarchical list; and
   displaying the further display region on the desktop relative to the display region having windows and the windowless display region corresponding to the hierarchical location of the display identifier of the further display region relative to the hierarchical location of the display identifier of the display region having windows and the hierarchical location of the display identifier of the windowless display region in the hierarchical list.

3. The method according to claim 1, further:
   receiving data for creating and displaying a first further windowless display region within a display region already displayed on the desktop;
   creating the first further windowless display region on the basis of the data received therefor;
   assigning a unique display identifier which is different from the windows handles;
   saving the assignment of the display identifier of the first further windowless display region to the first further windowless display region;
   saving the display identifier of the first further windowless display region at a predetermined location in a hierarchical sub-list associated with the already displayed display region;
   displaying the first further windowless display region within the display region already shown on the desktop;
   receiving data for creating and displaying a second further windowless display region within the display region already displayed on the desktop;
   creating the second further windowless display region on the basis of the data received therefor;
   assigning a unique display identifier which is different from the windows handles;
   saving the assignment of the display identifier of the second further windowless display region to the second further windowless display region;
   saving the display identifier of the second further windowless display region at a predetermined location in the hierarchical sub-list associated with the already displayed display region; and
   displaying the second further windowless display region within said display region already displayed on the desktop,
   wherein the first further windowless display region is displayed in front of the second further windowless display region when, in the sub-list assigned to the already displayed display region, the location of the display identifier of the first further windowless display region lies hierarchically before the location of the second further windowless display identifier of the display region having windows and vice versa.

4. The method according to claim 3, wherein the display region already displayed on the desktop, in which further windowless display regions are displayed, is windowless.

5. The method according to claim 1, further comprising:
saving the display identifier of a newly created display region at the hierarchically top location of the hierarchical list.

6. The method according to claim 1, further comprising:
saving the display identifier of a display region, which is selected with a pointing device on the desktop, at the hierarchically top location in the hierarchical list.

7. The method according to claim 1, further comprising:
arranging a display region at a predetermined location on the layout;
determining all the regions of the other display regions displayed on the desktop that overlap with the display region located at the predetermined location; and
clipping out these overlapping regions of the other display regions so that the display region arranged on the layout at the predetermined place is completely visible.

8. The method according to claim 1, further comprising:
continuously receiving data for updating the displays of a display region shown on the desktop;
updating the displays of the display region displayed on the desktop on the basis of the continuously received data; and
minimizing or hiding the display region in response to a user command,
wherein for the minimized or hidden display region, the continuous reception of data is interrupted.

9. The method according to claim 1, wherein the display regions are used to display measurement data elements for real-time measurement data in hardware-in-the-loop applications.

* * * * *